June 4, 1963 K. E. KNEUSS 3,092,231
DIAPHRAGM AND WEAR SHOE ASSEMBLY FOR CLUTCH OR BRAKE
Filed June 29, 1961
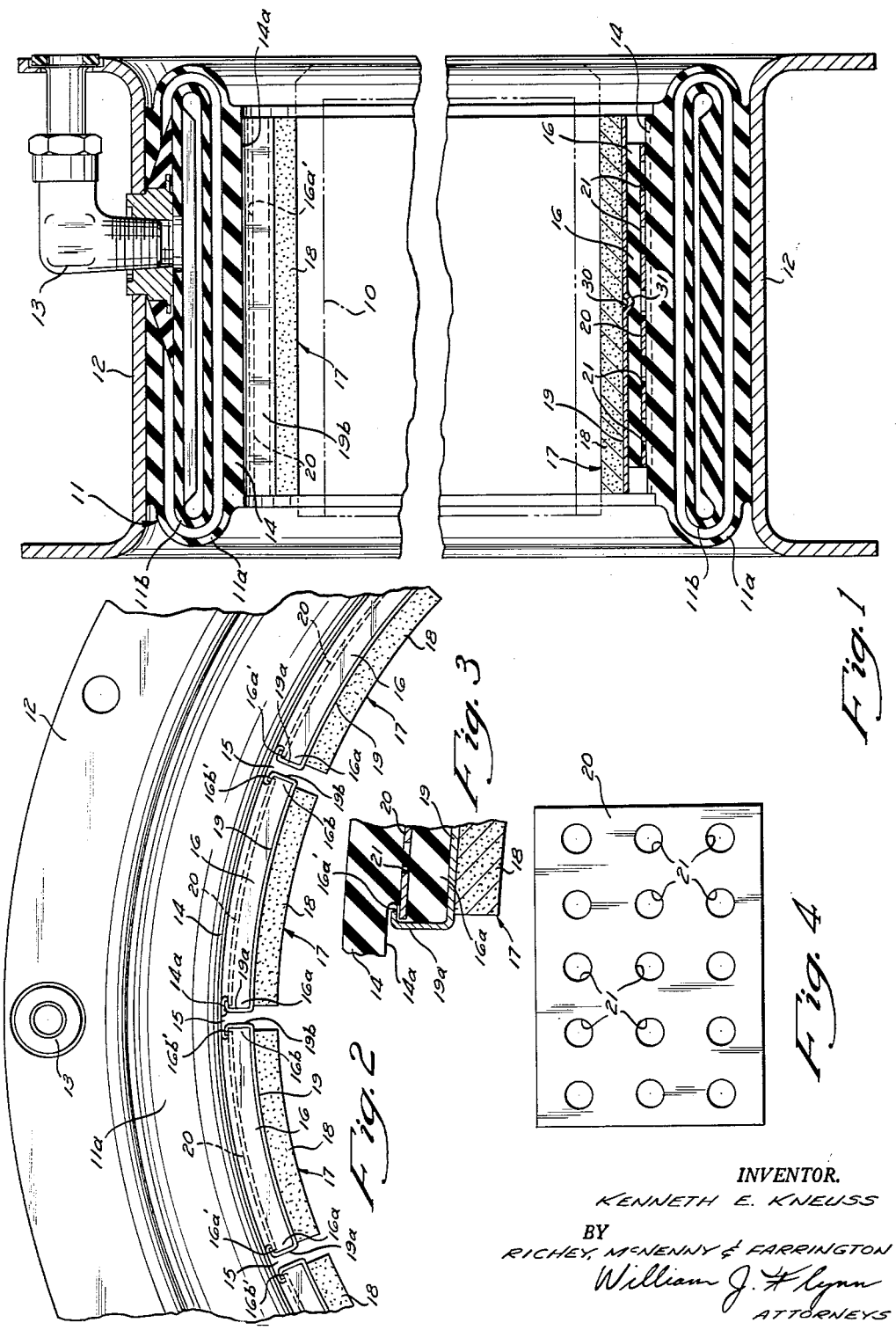
INVENTOR.
KENNETH E. KNEUSS
BY
RICHEY, McNENNY & FARRINGTON
William J. Flynn
ATTORNEYS United States Patent Office 3,092,231
Patented June 4, 1963

3,092,231
DIAPHRAGM AND WEAR SHOE ASSEMBLY
FOR CLUTCH OR BRAKE
Kenneth E. Kneuss, Cleveland, Ohio, assignor to Fawick Corporation, Cleveland, Ohio, a corporation of Michigan
Filed June 29, 1961, Ser. No. 120,610
5 Claims. (Cl. 192—107)

This invention relates to an assembly of a hollow, fluid-distensible diaphragm, which has an annular inside circumferential wall of rubber-like material, and a plurality of circumferentially spaced wear shoes mounted on this diaphragm wall for movement radially into and out of engagement with a clutch or brake drum as the diaphragm is inflated and deflated.

The wear shoes in the present assembly have individual slip-on connections at the inside circumferential wall of the diaphragm, so that they may be replaced readily individually. In accordance with the present invention the diaphragm has a novel arrangement for preventing the wear shoes from becoming loose or completely detached from the diaphragm as a result of the repeated operation of the clutch or brake.

It is an object of this invention to provide a novel and improved diaphragm and wear shoe assembly for a constricting clutch or brake.

It is also an object of this invention to provide such an assembly in which the wear shoes have a more secure slip-on attachment to the diaphragm.

Another object of this invention is to provide such an assembly in which the diaphragm has improved dimensional stability where the wear shoes are attached.

Further objects and advantages of this invention will be apparent from the following detailed description of a presently-preferred embodiment thereof, which is illustrated in the accompanying drawing.

In the drawing:

FIGURE 1 is an axial section, with parts broken away, of a diaphragm and wear shoe assembly embodying the present invention;

FIGURE 2 is a partial end elevational view of the FIGURE 1 assembly;

FIGURE 3 is an enlarged fragmentary section showing the slip-on attachment of a wear shoe to the diaphragm; and FIGURE 4 is a plan view of one of the reinforcing plates embedded in the diaphragm.

Referring first to FIGURE 1, the usual annular clutch or brake drum 10 is surrounded by a hollow, annular, fluid-distensible diaphragm or torque bag 11. The diaphragm is securely attached to the inside of a metal ring 12. Either the drum 10 or the ring 12 is rotatable with respect to the other. The diaphragm 11, when inflated, provides a clutching engagement or coupling between these members. An inlet-outlet fitting 13 supported by the ring 12 provides for the flow of suitable fluid, such as air or hydraulic liquid, into and out of the diaphragm.

The diaphragm or torque bag 11 is made up of an outer hollow annulus 11a, which at its outer circumference is vulcanized to the inside of ring 12, and an inner tube 11b. Preferably, both the inner and outer members of the diaphragm are made of cord-reinforced, vulcanized soft rubber or other rubber-like material having suitable characteristics of deformability and resiliency. As shown in FIGURE 1, the fluid inlet-outlet fitting 13 communicates with the interior of the inner tube 11b. When fluid under pressure is introduced through this fitting into the inner tube, the diaphragm is distended radially inwardly toward the drum 10.

As shown in FIGURE 1, the outside member 11a of the diaphragm has an inner circumferential wall 14 which is relatively thick radially and is substantially thicker axially. As best seen in FIGURE 2, this inside wall of the diaphragm is formed with a series of circumferentially spaced, axially extending, wear shoe recesses 15. Each of these recesses is substantially T-shaped, viewed axially, and each is open at both axial ends of the diaphragm.

Between each successive pair of such recesses 15 the inside wall of the diaphragm presents an integral, radially inwardly protruding, arcuate segment 16 which has circumferentially projecting, wear shoe interlock flanges 16a and 16b at its opposite circumferential ends. Each of these flanges presents a shoulder, 16a' or 16b', which faces radially outward. As best seen in FIGURE 1, the axial length of each segment 16 is somewhat shorter than that of the remainder of the diaphragm. Each flange 16a and 16b extends the full axial length of the corresponding segment 16.

The space between the confronting end faces of the interlock flanges 16a and 16b on each pair of neighboring segments 16 defines the stem, or narrow portion, of the T of the recess 15 between them. The head, or wide portion, of the T is at the radial space between the radially outwardly-facing shoulders 16a' and 16b' on these interlock flanges 16a and 16b and the inside circumferential surface 14a of the diaphragm wall 14.

The assembly also includes a plurality of wear shoes 17 detachably mounted individually on the diaphragm segments 16. Each of these wear shoes comprises an arcuate block 18 of friction material and an arcuate sheet metal base plate 19. Each base plate has hook-shaped opposite ends 19a and 19b which snugly engage the respective interlock flanges 16a and 16b on the opposite ends of the corresponding segment 16 of the diaphragm. As best seen in FIGURE 2, each of these hook-shaped ends extends radially outward snugly across the end face of the respective interlock flange 16a or 16b and then circumferentially snugly across its radially outwardly-facing shoulder 16a' or 16b'. Each friction block 18 is secured, such as by vulcanized adhesion, to the arcuate radially inward face of the corresponding base plate 19. The latter has a curvature conforming closely to the arcuate curvature of the radially inside face of the respective diaphragm segment 16.

As shown in FIGURE 1, each wear shoe base plate 19 is formed with an integral, radially outwardly projecting, rounded protrusion 30 which is received snugly in a complementary recess 31 in the radially inward face of the corresponding diaphragm segment 16. This is to prevent the wear shoe from accidentally sliding endwise (axially) after it has been assembled onto the diaphragm.

In accordance with the present invention a rigid reinforcing plate 20, preferably of steel, is embedded in and completely covered by the rubber-like material of each diaphragm segment 16. The plates are secured in the diaphragm segments 16 by vulcanized adhesion. As shown in FIGURE 2, each of these reinforcing plates has an arcuate curvature corresponding to the curvature of the diaphragm where it is located. Each reinforcing plate extends from the interlock flange 16a at one end of the respective diaphragm segment 16 to the interlock flange 16b at the opposite end. Each plate 20 is positioned just a slight distance radially inward from the radial positions of the respective shoulders 16a' and 16b' on the corresponding diaphragm segment 16, as best seen in FIGURE 3.

As shown in FIGURE 4, each plate 20 is formed with a plurality of holes 21. The plates are positioned in the mold before the diaphragm is molded. While the diaphragm is being molded its rubber-like material fills the holes 21 to enhance the connection between the diaphragm and each reinforcing plate.

Each wear shoe may be mounted on the diaphragm by sliding it axially across the respective diaphragm segment 16, with its hook-shaped ends 19a and 19b engaging the respective interlock flanges 16a and 16b on the diaphragm segment. The turned-in end extremities of the wear shoe base plates engage behind the shoulders 16a' and 16b', as shown in FIGURES 2 and 3.

It has been found that the provision of the reinforcing plates 20, as described, greatly improves the security and stability of the interlock between the diaphragm and the wear shoes.

In the absence of these plates, when the diaphragm is inflated the wear shoes 17 move radially inward substantially immediately. However, the diaphragm segments 16 do not move radially inward immediately, so that for a visually observable interval there is a radial gap between the radially inside face of each diaphragm segment 16 and the base plate 19 of the corresponding wear shoe. Following this, the diaphragm segments 16 move inwardly and, at the same time, each segment 16 spreads circumferentially, exerting a very great endwise pressure against the hooked ends 19a and 19b of the wear shoe base plate. This circumferential cold flow of the rubber, under the influence of the inflation pressure, tends to spread apart the opposite hooked ends of the wear shoe base plate. In some instances, this may be sufficient to abruptly force the wear shoe off the diaphragm. In other instances it permanently deforms the hooked ends of the wear shoe, so that when the inflation pressure is released and the diaphragm returns to its initial condition the wear shoe no longer has a snug interlock with the diaphragm.

It has been found that the reinforcing plates 20 substantially eliminate this disadvantageous cold flow of the diaphragm segments 16 when the diaphragm is inflated. Instead, each diaphragm segment 16 retains substantially the same size and shape, regardless of whether the diaphragm is inflated. Therefore, the snug interlock between the diaphragm and each wear shoe is maintained over a substantially indefinite period of time. Apparently, the presence of each plate 20 at a location just radially inward from the wear shoe interlock portions of the diaphragm prevents any substantial cold flow of the rubber-like diaphragm material from taking place in the portion of each segment 16 between the embedded reinforcing plate 20 and the radially inward face of the diaphragm segment. The cold flow can occur only in some other portion of the diaphragm, where its effects are of no consequence as far as the wear shoe attachments are concerned.

Another observable effect is that the diaphragm segments 16 move radially inward in unison with the wear shoes substantially immediately when the diaphragm is inflated. The previously-noted tendency for a radial gap to occur between the wear shoe and the diaphragm is substantially completely eliminated.

Another advantage flowing from the provision of the reinforcing plates is that the dimensions of the diaphragm segments 16, as formed in the mold, are more exact than was possible heretofore. This makes it easier to provide a more accurate initial snug fit between these diaphragm segments and the wear shoes.

While a presently-preferred embodiment of the invention has been shown in the accompanying drawing and described in detail herein, it is to be understood that various modifications, omissions and refinements which depart from the disclosed embodiment may be adopted without departing from the spirit and scope of this invention. For example, the reinforcing plates 20 could differ in size, shape or number from the particular arrangement shown. Also, each reinforcing plate 20 could be located closer to the radially inward face of the respective diaphragm segment 16 than shown. In any such alternative arrangement, as well as in the preferred arrangement shown in the drawing, the thickness of each diaphragm segment 16 radially inward from the reinforcement 20 to the radially inward face of the diaphragm segment is small enough to prevent any substantial amount of cold flow of the rubber-like material there which would tend to dislodge the respective wear shoe from the diaphragm segment.

What is claimed is:

1. A diaphragm and wear shoe assembly comprising an annular hollow fluid-distensible diaphragm having an annular inside circumferential wall of rubber-like material, said inside wall having a plurality of circumferentially spaced segments at its radially inward side, each of said segments terminating at its opposite ends in circumferentially protruding interlock flanges which present radially outwardly facing shoulders, a plurality of rigid reinforcing plates embedded in said segments and respectively extending circumferentially from one interlock flange on the respective segment to the interlock flange on the opposite end thereof, and a plurality of wear shoes mounted on said segments at the radially inward side of the latter, each of said wear shoes having hooked opposite ends which snugly engage said shoulders on the respective segments.

2. A diaphragm and wear shoe assembly comprising an annular hollow fluid-distensible diaphragm having an annular inside circumferential wall of rubber-like material, said wall having a plurality of circumferentially spaced integral segments of rubber-like material which project radially inwardly, each of said segments terminating at each circumferential end thereof in a circumferentially protruding interlock flange which presents a radially outwardly facing shoulder, the adjacent ends of neighboring segments being separated by recesses which are T-shaped axially of the diaphragm and which are open at the radially inward side of the segments, a plurality of arcuate rigid metal reinforcing plates embedded in and bonded to said diaphragm wall segments, each of said plates lying just radially inward from said shoulders and extending from the shoulder at one end of the respective segment to the shoulder at the opposite end thereof, and a plurality of wear shoes extending snugly across the radially inward faces of the respective diaphragm wall segments, each of said wear shoes having hooked opposite ends extending across the respective opposite circumferential ends of the corresponding segments and terminating in inturned extremities which snugly engage said shoulders.

3. The assembly of claim 2 wherein each of said reinforcing plates has a plurality of through holes therein and is molded in place in the diaphragm.

4. In a diaphragm and wear shoe assembly including an annular hollow fluid-distensible diaphragm having an annular inside circumferential wall of rubber-like material, said wall having a plurality of circumferentially spaced segments at its radially inward side, and a plurality of wear shoes detachably interlocked with said segments and extending across the radially inward side of the latter, the improvement which comprises a plurality of rigid reinforcements embedded in and bonded to said segments, each of said reinforcements extending circumferentially in the respective segment sufficiently close to the radially inward side of the latter to substantially prevent cold flow in a circumferential direction of the rubber-like material of said segment thereat.

5. In a diaphragm and wear shoe assembly which includes an annular hollow fluid-distensible diaphragm of rubber-like material having a plurality of circumferentially spaced segments at its radially inward side, said segments terminating at each circumferential end in a circumferentially protruding interlock flange, and a plurality of wear shoes extending across the radially inward faces of the respective segments and having hooked ends engaging said interlock flanges, the improvement which comprises a plurality of rigid reinforcement plates embedded in and bonded to said segments, each of said reinforcement plates extending from one of said interlock flanges on the respective segment to the interlock flange at the opposite end of said segment sufficiently close to the radially inward face of said segment to substantially prevent cold flow in a circumferential direction of the rubber-like material of the respective segment thereat.

References Cited in the file of this patent

UNITED STATES PATENTS

| | | |
|---|---|---|
| 1,330,756 | Brown | Feb. 10, 1920 |
| 1,420,979 | Ehlich | June 27, 1922 |
| 2,630,198 | Kraft | Mar. 3, 1953 |
| 2,662,625 | Fawick | Dec. 15, 1953 |
| 2,723,015 | Wellauer | Nov. 8, 1955 |
| 2,897,924 | Fawick | Aug. 4, 1959 |